Dec. 6, 1966        R. J. GOULD        3,289,928
GOLF CART ACCESSORY
Filed Sept. 27, 1965
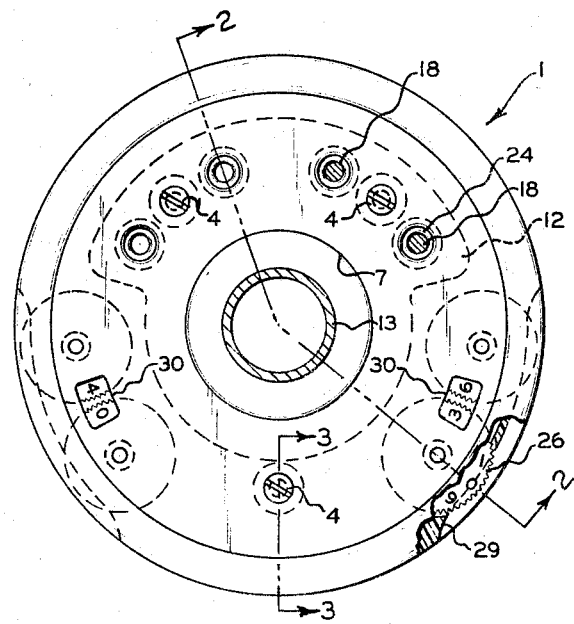
FIG. 1
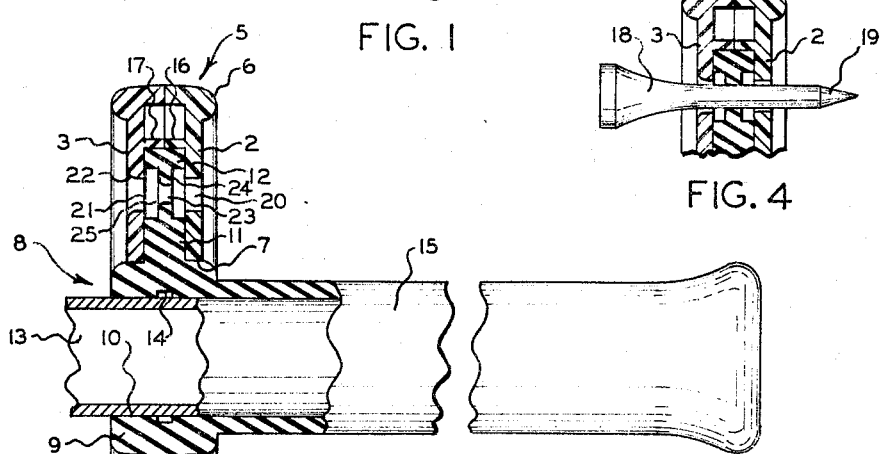
FIG. 4
FIG. 2
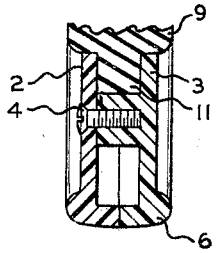
FIG. 3
INVENTOR.
RICHARD J. GOULD
BY
ATTORNEYS

United States Patent Office 3,289,928
Patented Dec. 6, 1966

3,289,928
GOLF CART ACCESSORY
Richard J. Gould, 1850 Lessur, Saginaw, Mich.
Filed Sept. 27, 1965, Ser. No. 495,755
4 Claims. (Cl. 235—1)

This application is a continuation-in-part of application Serial No. 293,790, filed July 9, 1963, now abandoned. The invention relates to a golf cart accessory and more particularly to a device adapted to be mounted upon the handle of a golf cart to form a grip for the handle and to provide a convenient holder for golf tees.

Various objects and advantages of the invention will be pointed out specifically or will become apparent from the following description when it is considered in conjunction with the appended claims and the accompanying drawing, in which:

FIGURE 1 is a view partly in front elevation and partly in section, with certain parts being broken away, of apparatus constructed in accordance with the invention;

FIGURE 2 is a sectional view of the apparatus taken on the line 2—2 of FIGURE 1;

FIGURE 3 is a sectional view taken on the line 3—3 of FIGURE 1; and

FIGURE 4 is a sectional detail of a portion of the apparatus shown in FIGURE 2 and illustrating a golf tee removably supported by the device.

An accessory constructed in accordance with the invention is designated generally by the reference character 1 and comprises a pair of annular, generally cup-shaped members 2 and 3 arranged in confronting relationship and separably joined together by suitable means, such as screws 4, to form a hollow casing 5. The casing forming members preferably are constructed of relatively rigid plastic material, such as styrene or polyethylene, for example, but other well known materials may be employed. The casing 5 may have a peripheral bead 6 for strength and is provided with a central opening 7.

The apparatus also includes a mounting member 8 formed of solid rubber or rubber-like material, the mounting member including an enlarged hub portion 9 surrounding an opening 10 that is axially aligned with the opening 7 in the casing. The hub 9 is surrounded by a radial flange 11 which is trapped between the case sections 2 and 3 so as snugly to support the member 8 in the casing, and a portion of the flange 11 is radially enlarged as at 12 for a purpose presently to be explained. The size of the opening 10 in the hub 9 is smaller than the size of the opening 7 in the casing, and the opening 10 also is slightly smaller than the external diameter of a tubular handle or tow bar 13 that forms part of a conventional golf cart (not shown). The disparity in sizes between the opening 10 and the handle 13 enables the mounting member 8 to have an interference fit with the handle 13 when assembled with the latter. Rubber and similar deformable materials, while yieldable, are not in themselves compressible, so the inner wall of the hub 9 is provided with at least one annular recess 14 into which the adjacent portions of the hub may be swaged during assembly of the apparatus on the handle 13. As is shown in FIGURE 2, the side walls of the recess 14 are straight. Thus, the edges of the recess in engagement with the handle 13 tend to exert a line force on the handle 13 upon relative sliding movement of the parts 8 and 13, thereby minimizing inadvertent separation of the accessory from the cart handle 13.

In the disclosed embodiment of the invention, the hub 9 is provided with an integral, hollow extension 15 projecting from one side of the hub. The purpose of the extension 15 is to provide a grip for the end of the handle 13. The extension 15 may be eliminated if desired.

The halves 2 and 3 of the casing 5 are provided with internal ribs 16 and 17 which abut one another when the sections are assembled. The ribs reinforce the intermediate portions of the casing and also serve to confine the flanges 11 and 12 of the mounting member.

During a round of golf a player will have occasion to make use of one or more golf tees 18, one of which is shown in FIGURE 4. Such tees conventionally have a pointed end 19 and, if the tees are carried in the player's pocket, the pointed ends are apt to punch holes in the pocket. Accordingly, means is provided in the device 1 for removably supporting a plurality of golf tees. The tee supporting means comprises a number of pairs of axially aligned openings 20 and 21 formed in the case sections 2 and 3, respectively, and the outer edge of each opening 21 preferably is outwardly flared as at 22 to facilitate insertion of the pointed end 19 of the tee therein. The tee supporting means also includes a number of openings 23 in the flange section 12 and axially aligned with the openings 20 and 21.

Each opening 23 is smaller in size than the openings 20 and 21 and preferably is smaller in size than the diameter of the shank of the tee 18. As a consequence, insertion of the tee through the opening 23 will cause the material surrounding the opening to be deformed. In order to permit deformation of the material surrounding each opening 23, the flange 12 is reduced in thickness adjacent each opening 23 so as to provide a thin wall section 24.

As is best shown in FIGURE 2, one end of each opening 23 is outwardly flared as at 25 to facilitate insertion of the tee through the opening, but the opposite end of the opening is straight edged. Owing to this construction, and to the interference fit between the wall of the opening 23 and the shank of the tee, an attempt to extract the tee from the opening will cause the straight edge of the wall of the opening to grip the tee shank more tightly. The gripping action of the wall section 24 on the tee will not be sufficiently great to make removal of a tee difficult, but it will be such as to prevent inadvertent removal of the tees as the cart is pulled from place to place.

Means is provided for enabling a player to record his score as the game progresses, and comprises a plurality of sets of indicia bearing reels 26 each of which has a spindle 27 journaled in openings 28 formed in each case section 2 and 3. The flange 12 is eliminated in the region of the reels 26 so as to permit them to be accommodated within the casing. It is preferred that no bearings be used in mounting the spindles 27, whereby the material from which the case sections are made restrains rotation of the reels 26. Rotation of the reels when desired is facilitated, however, by serrating the edges of the reels as at 28.

The sets of numeral reels 26 are mounted within the casing in such positions that no part of the reels projects beyond the edge of the casing. However, the peripheral wall of the casing is provided with grooves 29 and openings adjacent the reels and through which the latter project so as to enable manual manipulation of the reels to be effected when desired. Because the reels do not project beyond the casing, inadvertent movement of the reels is minimized.

Each of the reels of a set bears ten digits, 0 through 9, and are arranged adjacent one another so that portions of the edges of each set of reels may be visible through window openings 30 formed in one casing wall. Manipulation of the numeral reels associated with one window 30 may be used to record the player's score on the first nine holes and the numeral reels associated with the second window 30 may be used to record the player's score on the second nine holes.

An opening may be provided in the edge of the casing 5 for attachment of a chain to which may be attached a clip board for a score card on which the season's scores may be recorded.

The disclosed embodiment is representative of a presently preferred form of the invention, but is intended to be illustrative rather than definitive thereof. The invention is defined in the claims.

I claim:

1. An accessory adapted to be mounted on the handle of a golf cart, said accessory comprising: a yieldable, resilient sleeve member which may be slipped axially on the handle, a rigid casing mounted on said sleeve in generally surrounding relation therewith, said casing comprising opposite side wall sections with aligned passages providing an opening to receive said sleeve member and there being a radially extending recess between said casing wall sections leading outwardly from the said opening in the casing; said sleeve member having a radially projecting resilient flange portion of reduced axial extent relative to the overall axial extent of said sleeve member received in said recess and sandwiched between said side wall sections; at least one of the side wall sections of the rigid casing and said flange portion of the resilient mounting member having aligned tee receiving openings, the openings in said flange portion being of a size to frictionally retain the tees and the openings in said wall section of the casing being greater in size than the openings in said flange portion to facilitate ready insertion of the tees.

2. The combination defined in claim 1 in which the opposite side wall section of the casing has tee passing openings aligning with the said tee receiving openings in the said one wall section and said openings in the said flange portion extend through said flange portion.

3. The combination defined in claim 1 in which said sleeve member projects axially beyond said casing to form a handle grip.

4. The combination defined in claim 1 in which movable indicia bearing members are carried by said flange portion; windows are provided in said casing permitting said indicia bearing members to be viewed; and means in said casing permit said indicia bearing members to be moved.

References Cited by the Examiner

UNITED STATES PATENTS

| | | | |
|---|---|---|---|
| 1,709,546 | 4/1929 | Stanton | 273—162 |
| 1,754,495 | 4/1930 | Anderson | 273—32 |
| 2,411,965 | 12/1946 | Hartung | 280—51 |
| 2,753,110 | 7/1956 | Simmons | 235—1.2 |
| 2,759,666 | 8/1956 | Wykoff | 235—1.2 |
| 2,844,047 | 7/1958 | Schaefer | 74—551.8 |
| 2,960,263 | 11/1960 | Goddard | 224—29 |
| 3,014,595 | 12/1961 | Bartman | 211—60 |

RICHARD B. WILKINSON, *Primary Examiner.*

T. J. ANDERSON, *Assistant Examiner.*